June 24, 1958  J. W. WEBER  2,840,252
ROLLER LIFT FOR BOAT TRAILER
Filed Feb. 28, 1956  2 Sheets-Sheet 2
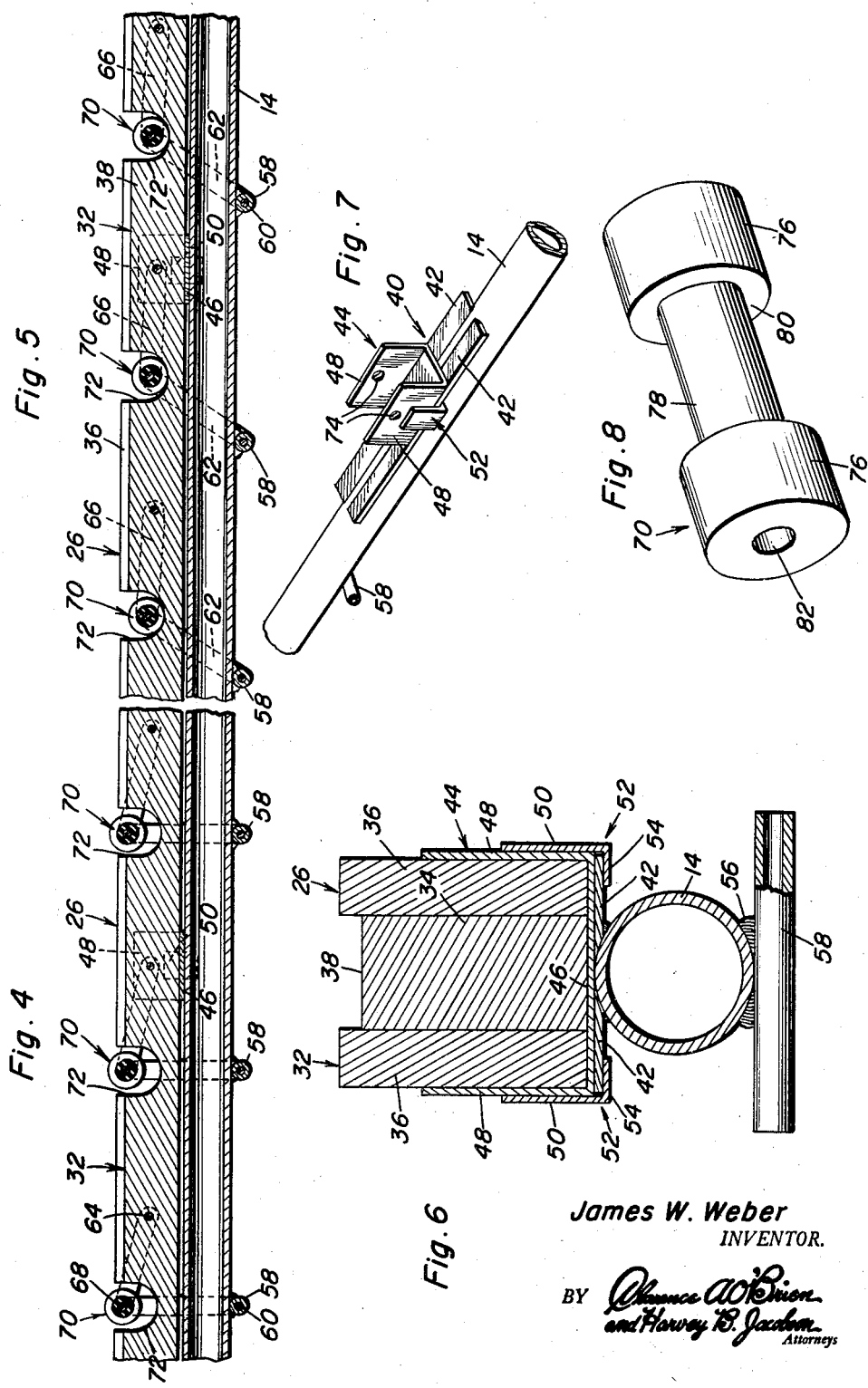
James W. Weber
INVENTOR.

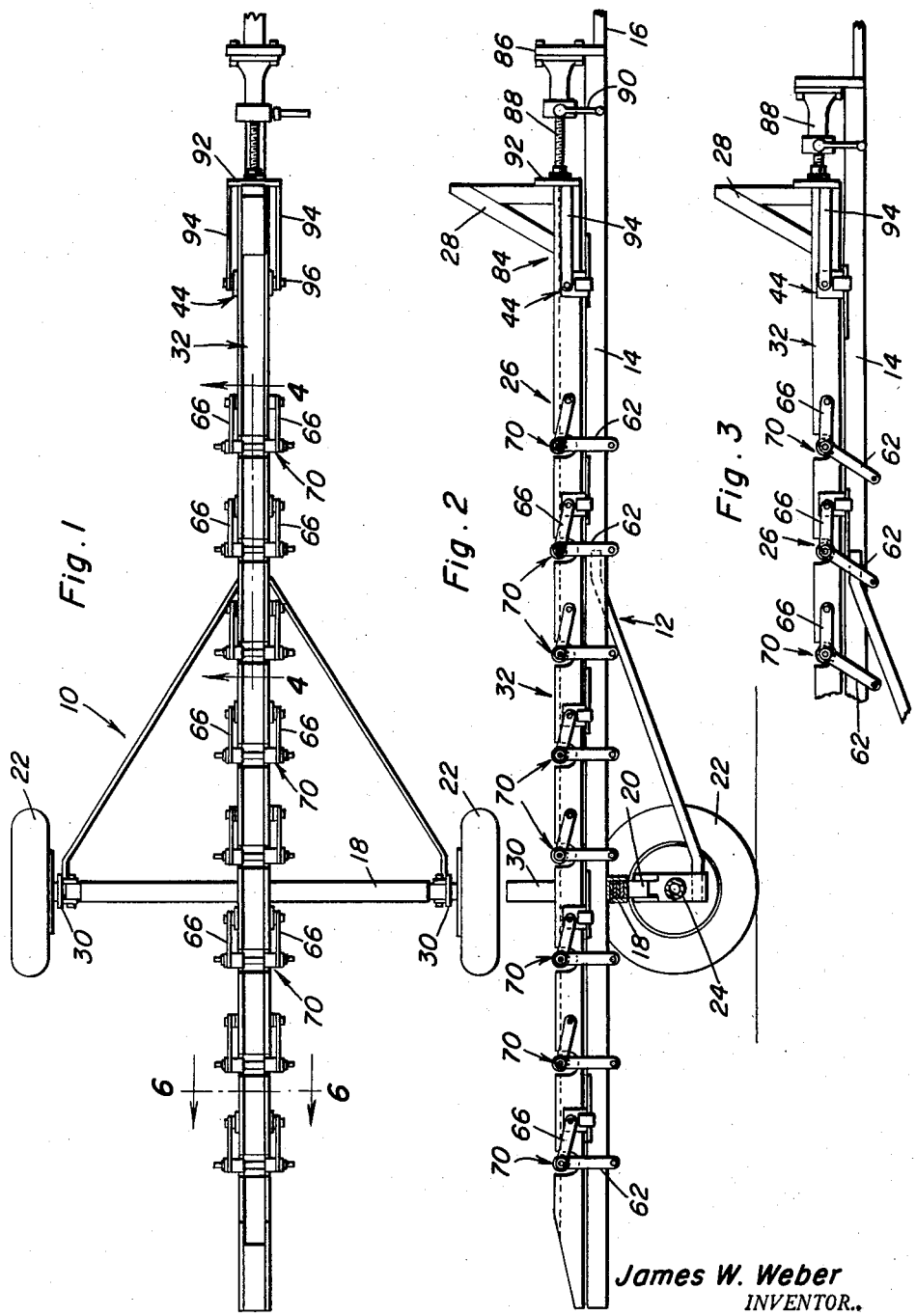

United States Patent Office 2,840,252
Patented June 24, 1958

2,840,252
ROLLER LIFT FOR BOAT TRAILER
James W. Weber, Freeport, Tex.
Application February 28, 1956, Serial No. 568,282
6 Claims. (Cl. 214—84)

This invention relates in general to new and useful improvements in trailers, and more specifically to improvements in construction of boat trailers.

The average boat is so constructed whereby the main strength thereof is in its keel. However, when a boat trailer is utilized, the boat is normally supported by rollers or other support elements which engage the boat along the bottom thereof necessitating the transfer of the load of the boat to the trailer through the bottom and the ribs of the boat and not through the keel. As a result, the boat, particularly in the case of a heavy boat or one having an inboard engine, there is a tendency for the keel to sag. Further, in most instances a boat, particularly the light boats, are not floated onto the trailers, but are rolled thereon or slid thereon with the rollers of the trailer progressively engaging the various portions of the bottom and side. This places undue loads on the boat at points where such loads are not contemplated in the designing of the boat.

It is therefore the primary object of this invention to provide an improved boat trailer which is so constructed whereby the trailer is provided with rollers for engaging the keel of the boat at all times during the loading so that a major portion of the weight of the boat may be transmitted to the trailer through the keel, that part of the boat which is designed to carry the maximum load of the boat.

Another object of this invention is to provide an improved boat trailer having a roller lift which is so designed whereby it will support a boat during a loading and unloading operation by engaging the keel thereof, said roller lift being disposed in overlying relation with respect to a keel engaging member whereby when the roller lift is retracted, the keel of the boat will set upon the keel engaging member and be supported thereby for transport.

Still another object of this invention is to provide an improved roller lift for boat trailers, the roller lift including a plurality of longitudinally spaced rollers, the rollers being provided with central recesses in which a keel of a boat may seat, the rollers also providing means for guiding the boat against transverse shifting with respect to the trailer during a loading and unloading operation.

A further object of this invention is to provide an improved roller lift for boat trailers which is so constructed whereby it will recess into a keel engaging member so that the boat may be transported on the trailer fully supported by the keel engaging member and may be lifted out of engagement with the keel engaging member by operating the roller lift to elevate the roller into engagement with the keel of the boat whereby the boat is then in a position to be easily rolled off the trailer.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a top plan view of the boat trailer employing the roller lift which is the subject of this invention;

Figure 2 is a side elevational view of the boat trailer with a portion of the wheel assembly thereof broken away for purposes of clarity and shows the roller lift in an elevated keel receiving position;

Figure 3 is a fragmentary side elevational view of the forward portion of the boat trailer and shows the roller lift in an inoperative position;

Figure 4 is an enlarged fragmentary longitudinal vertical sectional view taken substantially upon the plane indicated by the section line 4—4 of Figure 1 and shows the specific details of the roller lift in an elevated keel engaging position;

Figure 5 is an enlarged fragmentary longitudinal sectional view similar to Figure 4 and shows the roller lift in a retracted or lowered position;

Figure 6 is an enlarged transverse vertical sectional view taken substantially upon the plane indicated by the section line 6—6 of Figure 1 and shows the specific manner in which the keel engaging member and the roller lift is slidably supported for movement longitudinally of a supporting frame member of the trailer, the rear roller and support links therefor being omitted for purposes of clarity;

Figure 7 is an enlarged fragmentary perspective view of the supporting frame member of the trailer with a major portion of the roller lift being omitted, there being illustrated the details of the slide plate for supporting the keel engaging member for sliding movement relative to the supporting frame member; and Figure 8 is an enlarged perspective view of one of the rollers and shows the specific details thereof.

Referring now to the drawings in detail, it will be seen that there is illustrated a boat trailer which is referred to in general by the reference numeral 10. The boat trailer 10 includes a frame construction which is referred to in general by the reference numeral 12. The frame construction 12 is formed primarily of an elongated longitudinally extending, centrally disposed supporting frame member 14 which also functions as a tow pole and is provided at its forward end with a hitch member 16. Extending transversely of the supporting frame member 14 and secured to the underside of a rear part thereof is a transverse frame member 18. The transverse frame member 18 is of an inverted U-shape and has disposed therein a transverse leaf spring 20.

In order that the frame 12 may be supported for movement along the road, there is provided a pair of wheels 22. The wheels 22 are supported by a transverse axle 24. The ends of the leaf spring 20 are suitably connected to the transverse axle 24 for transferring the load from the frame 12 to the wheels 22 through the axle 24.

In order that a boat may be properly positioned upon the frame 14, there is provided the roller lift which is the subject of this invention, the roller lift being referred to in general by the reference numeral 26. There is also provided on the forward portion of the supporting frame member 14 a bow stop 28. Further, the supporting frame 12 is provided at opposite ends of the transverse frame member 18 with upstanding side retaining members 30. The side retaining members 30, if desired, may be provided with suitable rollers to engage the side of a boat carried by the trailer 10. If desired, additional conventional types of boat centering and supporting members may be used in conjunction with the frame 12.

The roller lift 26 includes a keel engaging member which is referred to in general by the reference numeral 32. The keel engaging member 32 is disposed in overlying relation with respect to the supporting frame member 14 and is mounted thereon for longitudinal sliding movement, as is best illustrated in Figures 6 and 7. The keel engaging member 32, as is best illustrated in Figure 6, is formed in three parts and includes a central member 34 and side plates 36, the side plates 36 being rigidly secured to the central member 34 and extending thereabove to form a recess 38. The recess 38 is intended to have disposed therein a projecting portion of a boat keel so that the keel engaging member 32 will both support the keel of a boat and also center such keel and prevent it from shifting transversely of the trailer 10. If desired, the keel engaging member 32 may be formed as an integral unit.

In order that the keel engaging member 32 may be mounted for longitudinal sliding movement with respect to the supporting frame member 14, there are provided a plurality of saddles which are referred to in general by the reference numeral 40. Each saddle assembly 40 is spaced longitudinally with respect to adjacent ones along the supporting frame member 14 and includes a slide plate assembly formed by a pair of horizontally disposed longitudinally elongated plates 42 which are suitably welded to the upper part of the supporting frame member 14 as is best illustrated in Figure 6. Seated on the plates 42 is a channel shaped carriage 44 which includes a web 46 directly resting upon the plates 42 and upstanding side flanges 48. Secured to the side flanges 48 are vertical flanges 50 of angle members 52. The angle members 52 include horizontal flanges 54 which are in opposed relation and which underlie the plates 42 so as to prevent relative movement between the carriage 44 and the plates 42.

Secured to the underside of the supporting frame member 14 at longitudinally spaced intervals by welding 56 are transverse sleeves 58. Passing through each of the sleeves 58 is a pivot bolt 60 which carries at the opposite end of the sleeve 58 upstanding first links 62.

Extending through the keel engaging member 32 at longitudinally spaced intervals are transverse pivot bolts 64. The pivot bolts 64 have pivotally mounted on opposite ends thereof a rearwardly extending second link 66. The links 66 are so disposed whereby there is one second link 66 for each first link 62. The links 62 and 66 are disposed in sets on opposite sides of the keel engaging member 32 and are pivotally connected together by a transverse shaft 68. Carried by each of the transverse shafts 68 is a keel engaging roller which is referred to in general by the reference numeral 70.

In order that the keel engaging rollers 70 may be retracted to permit a keel to rest upon the keel supporting member or keel engaging member 32, the keel engaging member 32 is provided with a plurality of longitudinally spaced recesses 72, the recesses being aligned with the rollers 70. Further, in order that the keel engaging member 32 may shift with its carriages 44, the flanges 48 of each carriage 44 is provided with transversely aligned bores 74 which receive one of the pivot bolts 64, the pivot bolt 64 being so positioned whereby certain ones of them are aligned with the carriages 44.

Referring now to Figure 8 in particular, it will be seen that each roller 70 includes enlarged outer portions 76 and a reduced central portion 78. The reduced central portion 78 provides a recess 80 in which a depending portion of a keel may seat, so that the roller 70 may not only support the boat being loaded on a trailer 10 through its keel, but also guide it against transverse shifting. Each roller 70 is provided with a central bore 82 through which the associated shaft 68 passes so that the roller 70 may be free to rotate thereon.

In order that the roller lift 26 may be operated, there are provided suitable operating means which are referred to in general by the reference numeral 84. The operating means 84 includes a support plate 86 at the forward end of the supporting frame member 14. Carried by the support plate 86 is a rearwardly extending extensible member 88 which may be in the form of a screw jack or the like. The extensible member 88 is provided with an operating handle 90. The rear end of the extensible member 88 includes a plate 92 which is connected to a forwardmost carriage 44 by means of straps 94. The straps 94 are connected to the carriage 44 by means of a suitable bolt 96. The plate 92 may also by suitably connected to the forward end of the keel engaging member 32.

When it is desired to load a boat on the trailer 10, the roller lift should be in an operative position. In order to accomplish this, the keel engaging member is moved rearwardly with respect to the supporting frame member 14 by extending the extensible member 88 to the position illustrated in Figure 2. The second link 66 cooperating with the links 62 move the rollers 70 upwardly with respect to the keel engaging member 32 so that they are disposed above respective portions of the keel engaging member 32. A boat is then moved onto the boat trailer 10 in the normal manner with the projecting portion of the keel thereof seating in the recesses 80 of the rollers 70 and the rollers 70 assuming a major portion, if not all of the weight of the boat. After the boat has been moved forwardly on the trailer 10 until the bow thereof engages the bow positioning member 28, the bow may be anchored with respect to the bow positioning member 28. Then the extensible member 88 is retracted with the result that the keel engaging member 32 moves forwardly and the rollers 70 are moved to a retracted position. The keel of the boat then settles onto the keel engaging member 32 and is supported thereby for travel. When it is desired to unload the boat, the above procedure is reversed.

Incidentally, although the bow positioning member 28 has previously been described as being attached to the supporting frame member 14, it may be attached either to the keel engaging member 32, as is illustrated in Figures 2 and 3, or to the supporting frame member 14, as desired.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In a boat trailer of the type including a central longitudinal supporting frame member, a combined keel support and roller assembly comprising a keel supporting a member overlying said supporting frame member, means mounting said keel supporting member on said supporting frame, a plurality of rollers spaced longitudinally of said keel supporting member, support means for said rollers connected to said supporting frame member and said keel supporting members, and means carried by said supporting frame member for shifting said keel supporting member relative to said supporting frame member to selectively raise and lower said rollers, whereby a keel of a boat may selectively ride on said rollers and be seated on said keel supporting member.

2. In a boat trailer of the type including a central longitudinal supporting frame member, a combined keel support and roller assembly comprising a keel supporting member overlying said supporting frame member, means mounting said keel supporting member on said supporting frame, a plurality of rollers spaced longitudinally of said keel supporting member, support means for said rollers connected to said supporting frame member and said keel supporting members, and means carried by said supporting frame member for shifting said keel supporting member relative to said supporting frame member to selectively raise and lower said rollers, whereby a keel of a boat may selectively ride on said rollers and be seated on said keel supporting member, said keel supporting member being provided with a plurality of longitudinally spaced transverse recesses, said recesses receiving said rollers.

3. In a boat trailer of the type including a central longitudinal supporting frame member, a combined keel support and roller assembly comprising a keel supporting member overlying said supporting frame member, means mounting said keel supporting member on said supporting frame, a plurality of rollers spaced longitudinally of said keel supporting member, support means for said rollers connected to said supporting frame member and said keel supporting members, and means carried by said supporting frame member for shifting said keel supporting member relative to said supporting frame member to selectively raise and lower said rollers, whereby a keel of a boat may selectively ride on said rollers and be seated on said keel supporting member, said rollers having central receiving recesses for guiding a keel.

4. In a boat trailer of the type including a central longitudinal supporting frame member, a combined keel support and roller assembly comprising a keel supporting member overlying said supporting frame member, means mounting said keel supporting member on said supporting frame, a plurality of rollers spaced longitudinally of said keel supporting member, support means for said rollers connected to said supporting frame member and said keel supporting members, and means carried by said supporting frame member for shifting said keel supporting member relative to said supporting frame member to selectively raise and lower said rollers, whereby a keel of a boat may selectively ride on said rollers and be seated on said keel supporting member, said keel supporting member being aligned with said recesses.

5. In a boat trailer of the type including a central longitudinal supporting frame member, a combined keel support and roller assembly comprising a keel supporting member overlying said supporting frame member, means mounting said keel supporting member on said supporting frame, a plurality of rollers spaced longitudinally of said keel supporting member, support means for said rollers connected to said supporting frame member and said keel supporting member, and means carried by said supporting frame member for shifting said keel supporting member relative to said supporting frame member to selectively raise and lower said rollers, whereby a keel of a boat may selectively ride on said rollers and be seated on said keel supporting member, said support means including first links pivotally connected to said supporting frame members and second links pivotally connected to said keel supporting member, shafts pivotally connecting said shaft and second links, said rollers being mounted on said shafts.

6. In a boat trailer of the type including a central longitudinal supporting frame member, a combined keel support and roller assembly comprising a keel supporting member overlying said supporting frame member, a plurality of longitudinally spaced rollers, support means for said rollers connected to said supporting frame member and said keel supporting member, and means extending between said supporting frame member and said keel supporting member for shifting said keel supporting member relative to said supporting frame to selectively raise and lower said rollers, whereby a keel of a boat may selectively ride on said rollers and be seated on said keel supporting member.

References Cited in the file of this patent

UNITED STATES PATENTS

| | | |
|---|---|---|
| 1,658,770 | Murray et al. | Feb. 7, 1928 |
| 2,485,793 | Vassar | Oct. 25, 1949 |
| 2,649,979 | Ball | Aug. 25, 1953 |
| 2,708,045 | Shontz | May 10, 1955 |
| 2,733,823 | Evans | Feb. 7, 1956 |
| 2,746,622 | Roy | May 22, 1956 |